K. KOHN.
INSULATED JOINT FOR RAILWAY RAILS.
APPLICATION FILED JULY 23, 1909.
Reissued Jan. 25, 1910.
13,079.
2 SHEETS—SHEET 1.
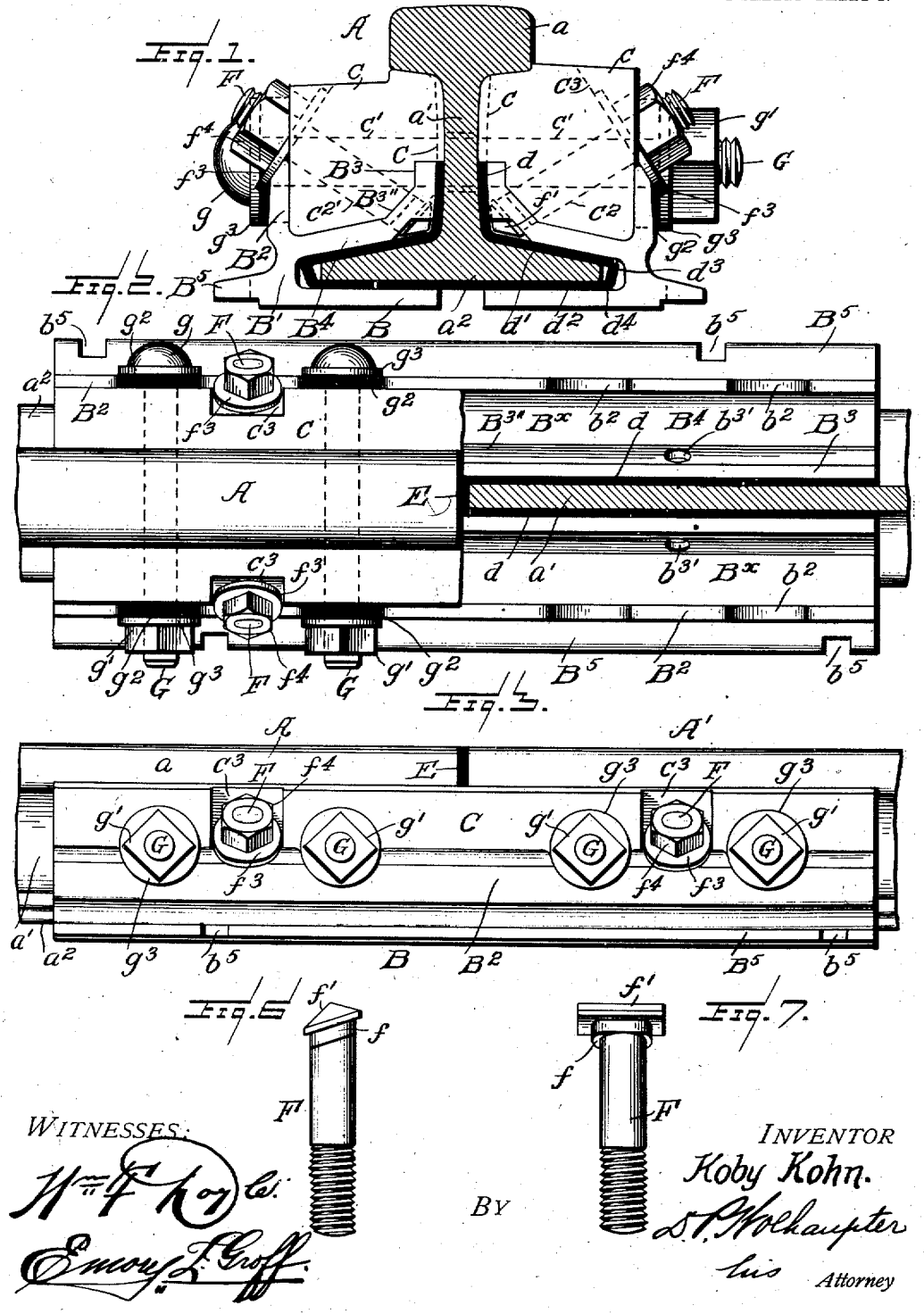
WITNESSES:
Wm. F. Kogel.
Emory L. Groff.
INVENTOR
Koby Kohn.
BY
S. P. Wolhaupter
his Attorney K. KOHN.
INSULATED JOINT FOR RAILWAY RAILS.
APPLICATION FILED JULY 23, 1909.
Reissued Jan. 25, 1910. 13,079.
2 SHEETS—SHEET 2.
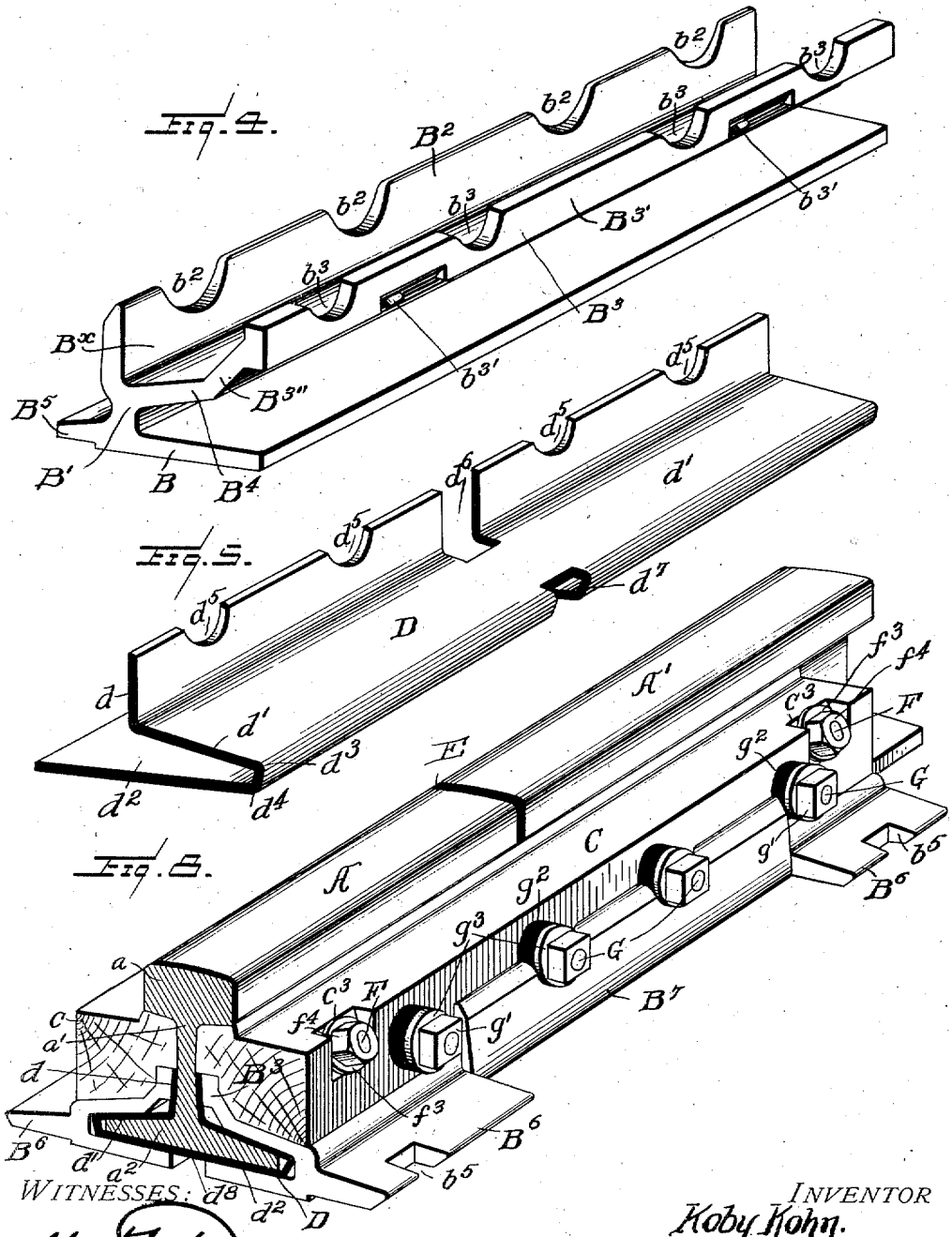
WITNESSES:
Wm F Kogel
Emory L. Groff
INVENTOR
Koby Kohn.
BY
L. P. Wakemeyer
his Attorney

UNITED STATES PATENT OFFICE.

KOBY KOHN, OF LINCOLN, NEBRASKA, ASSIGNOR TO THE RAIL JOINT COMPANY, A CORPORATION OF NEW YORK.

INSULATED JOINT FOR RAILWAY-RAILS.

13,079. Specification of Reissued Letters Patent. Reissued Jan. 25, 1910.

Original No. 879,878, dated February 25, 1908, Serial No. 321,691. Application for reissue filed July 23, 1909. Serial No. 509,241.

*To all whom it may concern:*

Be it known that I, KOBY KOHN, a citizen of the United States, residing at Lincoln, in the county of Lancaster and State of Nebraska, have invented certain new and useful Improvements in Insulated Joints for Railway-Rails, of which the following is a specification.

My invention relates to improvements in insulated joints for railway rails, and has for its object to provide an improved and simplified construction of such devices, and to these ends my invention consists in the various features of construction and arrangement of parts having the functions and adapted to coöperate together to produce the results substantially as hereinafter more particularly pointed out.

Referring to the accompanying drawings, wherein I have illustrated a preferred embodiment of my invention in connection with which I will explain the principles thereof so as to enable those skilled in the art to understand and utilize the same,—Figure 1 is a vertical cross section of a rail and insulated joint therefor; Fig. 2 is a plan and part sectional view of the same; Fig. 3 is a side view; Fig. 4 is a perspective view of the channeled base support; Fig. 5 is a perspective view of one of the insulating strips or separators; Figs. 6 and 7 are side views of the oblique bolt; and Fig. 8 is a perspective view of a modification.

While I have illustrated and will now proceed to describe the preferred embodiment of my invention, and will show it as adapted to the well known T-rail, it will be understood that my invention is not limited to this particular use of the insulated joint, nor to the details of construction and arrangement of parts described, it being evident that these parts may be varied by those skilled in the art to adapt them to be used in connection with various kinds of rails and in various positions and relations, without departing from the spirit of my invention. The various features described may be used in combination with each other, or with one another, or with other equivalent structures, the shape and characteristics of the various elements being varied according to the circumstances of each particular case.

In the drawings A, A′ represent adjacent ends of two rail sections, in this particular instance being shown as an eighty-pound A. S. C. E. standard rail section, and each rail comprises a head $a$, a web $a'$ and base $a^2$.

My improved channeled base support comprises two complementary parts, which are adapted to embrace opposite sides of the bases of the rails, and to be braced against the opposite sides of the webs of the rails, and I will letter the corresponding portions of the two parts the same, and specifically describe one of the parts.

Each part of the channeled base support, one of which is best illustrated in Fig. 4, comprises a base portion B, which is adapted to extend to a greater or less extent under the base $a^2$ of the rail, and extending from this base portion is a neck portion B′, forming a connection between the base and the channeled portion proper. This channeled portion, as shown, comprises a thrust-plate or portion $B^2$, a brace portion $B^3$, and a web portion $B^4$, the latter three being so shaped as to form an open vertical channel $B^x$. Also projecting from the base portion B and neck B′ is an elevated spike-rib, or extension $B^5$. These portions, which form the channeled base support, may be made in any suitable way, as by rolling, casting, or otherwise, and they are provided with certain recesses, bolt-holes, etc., which may be formed in any well known way, and arranged in proper position to receive the various bolts, washers, or other parts of the rail joint. I have shown the thrust-plate $B^2$ as provided with certain recesses $b^2$ which are preferably made in the manner indicated in the drawing with rounded corners, and of a configuration adapted to receive and fit the washers on the transverse bolts, as hereinafter described.

The brace portion $B^3$ is also provided with certain recesses $b^3$ of a shape and configuration, preferably, such as is shown in the drawing, to permit the passage of the transverse bolts and, preferably, these recesses are considerably larger than the bolts used, so that the bolts will not come in contact with the brace portion. This brace portion, as shown, comprises practically two parts, one a vertical bearing portion $B^3$, adapted to bear against the web of the rail, and the other an inclined connection portion $B^{3''}$, which connects the upright portion with the web portion $B^4$. This inclined connecting portion is provided with openings $b^{3'}$ for the reception of the oblique bolts, hereinafter described, and in order to furnish a good bearing for the heads of the bolts, the lower inner edge of the upright portion is cut away, as shown. These openings for the bolts are preferably made of some other shape than round to receive the necks of the bolts, hereinafter described, so as to prevent the bolts from turning therein.

The spike extension $B^5$ is provided with the usual spike openings $b^5$, arranged in any desired relation for securing the base support to the ties.

Arranged at either side of the rail sections are the insulating blocks, bars, or billets C, which may be of any suitable material, but preferably of wood. These bars are of a contour to substantially conform to the channel $B^x$, and also to the outline of the upper portion of the web of the rail and the under portion of the head of the rail, and are arranged so that they are below the line of movement of the flange of the wheel. The side bars are preferably grooved at $c$ opposite the space between the adjacent ends of the rails to permit the reception of an end-post E, which is larger than the cross section of the web of the rail. The side bars are also perforated, as at $c'$, to receive the transverse bolts, and are also perforated, as at $c^2$, to receive the oblique bolts, and in order to furnish a good bearing for the washers or fastening devices for said bolts, the bars are cut away, as at $c^3$.

Interposed between the channeled base supports, and the base of the rail, and preferably a portion only of the web of the rail, are insulating strips, sheets, or separators D, one of which is shown in perspective in Fig. 5. These separators may be made of any suitable insulating material such as indurated fiber or equivalent material, and may comprise the upright portion $d$, which bears against a portion of the web of the rail, the top portion $d'$ bearing upon the top of the base of the rail, and the base portion $d^2$, which extends under the base of the rail. These base portions may be of the same width in the two separators, but I have found it to be advantageous to make one of the base portions of greater width than the other, so that the wide portion will extend past the middle line of the base of the rail, and cover the space between the adjacent base portions B of the channeled base supports, as best shown in Fig. 1.

The base portions and top portions of the separators are connected at their outer edges, and I preferably make this connecting portion with two bends, $d^3$, $d^4$, and these are preferably of different radii, and the connecting portion between these bends preferably extends at an oblique angle to the base portion $d^2$. The separator is also provided with suitable recesses $d^5$ to receive the transverse bolts, and these are preferably shaped as indicated, and are preferably made larger than the diameter of the bolts so as not to come directly in contact with the surface of the bolts. The separator is also provided with a recess $d^6$ to receive the insulated end-post E, and this recess preferably extends through the upright portion $d$, and some distance into the top portion $d'$ to prevent crushing. The separator is also, in the preferred form, cut away as at $d^7$ opposite the end-post in the bent portion uniting the base and top portions, and this opening also preferably extends for some distance into the top and base portions, to avoid the tendency to crush the insulating separator at this point.

The insulating bars, which, as I have before stated, are made to conform to the channel in the channeled base supports, are secured in position by any suitable means, and I have shown, in the present instance, oblique bolts F, which extend through openings as $b^{3'}$ in the inclined connecting portions and through openings $c^2$ in the side bars, and are secured therein by suitable washers and nuts bearing upon the cutaway portions $c^3$. These oblique bolts are preferably formed with necks $f$ of some contour other than round, as, for instance, oval or angular, adapted to fit the openings $b^{3'}$ and thereby prevent the bolts turning in said openings. The bolts are also provided with oblique heads $f'$ to fit the inclined under surface of the brace portion of the channeled base support. The outer contour of these heads is preferably angular in shape, so as to practically fill the space between the inclined face of the brace portion of the channeled base support and the insulating separator, adjacent the junction of the web and base of the rail. In the present instance, I have shown the bolts with metal washers $f^3$ and nuts $f^4$, upon the outer ends of the oblique bolts, but any well known form of lock nuts or other fastening devices may be used.

The washers $f^3$ may be omitted, as the arrangement is such that the nut or washer will bear upon the upper end of the thrust-plate $B^2$, and cut away portion $c^3$, and this thrust-plate is preferably inclined, as shown in the drawing, to form a good bearing therefor.

The two opposing parts of the insulating joint are held in position on opposite sides of the rail in any suitable way, and in the present instance, I have shown transverse bolts G, which are arranged to pass through the openings $c'$ of the bars, and through openings in the web of the rail, and I provide suitable insulating and other washers between the heads $g$ and nuts $g'$ of the bolts, and the adjacent parts of the joint.

Various arrangements of washers may be used, but in the present instance I have shown washers $g^2$ of insulating material, and these are of a thickness to extend outward more or less beyond the outer surface of the thrust portions $B^2$ of the channeled base supports, and these washers are preferably of a shape to substantially conform to the recesses $b^2$ in the thrust-plate. Outside of these insulated washers, I have shown metal washers $g^3$, and it is evident that any desired number of washers may be used, or any lock-nut fastening devices may be applied to the bolts in a manner well understood by those skilled in the art.

In Fig. 8 I have indicated one modification of my invention, wherein the corresponding parts are similarly lettered, and wherein there are some changes in the details of construction, notably in the formation of the channeled base supports. In this construction, the spike-rib or extension $B^6$ is extended outward to a greater extent than in the other construction, and has a portion thereof, preferably an extended central portion, turned upward to form the thrust-plate or portion $B^7$ of the base support. In this modification, also, the separator has its base portion $d^8$ extended so as to practically cover the space between the bases B of the channeled base supports, and is in one piece instead of being constructed as shown in Fig. 1. Also, in this modification, the oblique bolts F are placed in different relation to the transverse bolts from that shown in Figs. 1, 2 and 3, being near the ends of the insulated bars, and beyond the transverse bolts, and hence, in this construction, the washers or nuts of the oblique bolts do not bear against the thrust portion of the channeled base as in the other form.

Having thus specifically described the general features of construction of the various parts of my insulated rail joint, the mode of assembling the parts and the purposes of the various constructions will be largely understood from what has been heretofore stated, but I will point out briefly some of the distinguishing features and results produced by these various constructions.

It will be observed that the channeled base supports are complete in themselves, and are adapted not only to engage the top and bottom portions of the bases of the rails, but that the brace portions extend upward and form supports tending to resist the lateral thrust of the rails at their adjacent ends. Moreover it will be noticed that in the preferred construction, these brace portions are shown as extending about half way up the web portions of the rails, and they are provided with openings $b^3$, which are preferably larger than the bolts so that there is no necessity of using insulation around the bolts, and this also prevents the tendency to crush the insulation at this point, when used, due to creeping or downward movement of the rails.

The insulated bar fits into the open vertical channel $B^x$, and is secured therein by the oblique bolts, and these parts may be put together and adjusted before the parts of the channeled base support are applied to the rails. When so adjusted and placed in position, it will be observed that the thrust-plate $B^2$ not only tends to hold the insulated bar in position against the webs of the rails and resist any lateral thrust, but also holds it against the under portion of the head of the rail, and tends to take up any downward or inclined thrust from the head of the rail.

In the actual use of insulated joints, it has been observed that the insulation is liable to be injured or destroyed within a relatively short time, owing to the strains put thereon, and the result has been that sooner or later the perfect insulation of the rails is destroyed and leaks occur which prevent the efficient operation of the electrical devices controlled by the currents passing through the rails. It is one of the objects of my present invention to provide insulation that is not subject to these disadvantages. It will be observed that my insulating separators extend only partially upward on the sides of the web, and are not in contact with the transverse bolts, and therefore are not subject to pressure or strain from said bolts. Moreover, it will be seen that the insulation is not subject to thrusts or movement of the under portions of the heads of the rails, especially at or near the adjacent ends of the two rails, where more or less relative movement always occurs, and which has a tendency to crush or destroy the insulation at these points. So too, when there are insulating thimbles or sleeves surrounding the bolts and extending through openings of any kind or openings in the webs of the rails, the same action is likely to occur to the detriment of the insulation. Furthermore, one of the weak points of the insulation is at or near the junction of the web and base of the rail, and by the peculiar formation of the brace portions, there is no actual pressure or bearing at this point, and this avoids a tendency of the insulation to break or disintegrate along this line, and especially so adjacent the ends of the rails. Again, in applying the insulating strips or separators to the rails and then tightening up the base supports, the insulation is liable to be broken or injured adjacent the outer edges of the base of the rails, and by the peculiar formation of these separators at this point, and having two bends preferably of different radii and an inclined portion between these two bends, I provide a structure which permits the placing of the separators in position, and tightening the joint without danger of injuring the separators, as there is sufficient play to provide for any exigency.

Difficulty is also experienced in the use of the insulated end-posts between the adjacent ends of the rails, as these have been found to be liable to be broken or crushed by the relative movements of the ends of the rails, and for this reason I have provided means for making the neck or web portion of these end-posts wider than the webs of the rails, and allow them to project into recesses in the insulating bars and into or through the recesses in the insulating separators; and this effectually prevents breakage or destruction of the end-posts and maintains efficient insulation between the rails at this point.

Another advantage due to the use of separators which extend upward practically to the top or through parts of the joint is due to the fact that insulators absorb more or less moisture which causes them to disintegrate or to reduce their efficiency as electrical insulators. It will be observed that in my construction the separators, while they may extend upward to a greater or less extent alongside of the webs of the rails, do not extend to the top of the bars, but are protected from the elements by said bars.

It will further be observed that by securing the insulating bars in the channels of the channeled base supports by oblique bolts arranged in the manner shown, there is no danger of these bolts or their nuts coming in line with the flanges of the wheels, even if, perchance, the nuts or bolts should become loosened, as they are arranged at such an angle that even under the most adverse circumstances, the nut cannot come within the line of movement of the wheel flanges.

I have before stated that I preferred to use insulating washers $g^2$, in connection with the transverse bolts, and that these washers were of a thickness to extend outward beyond the outer faces of the thrust-plates or portions of the base supports. The advantage of this arrangement is that when, for instance, the metallic washers, as $g^3$, slip or become displaced, they are prevented from coming in contact with the metal of the thrust-plate, for if they should slip down, they would be held away from said thrust-plate by the interposed insulated washers. This construction obviates the use of sleeves or thimbles of insulating material upon the bolts, which, as before intimated, are open to objections. Further, it will be observed that the insulating material is so arranged as not to expose it to the action of the various parts where there is a tendency to cut or crush the same, due to the movements of the parts in actual use.

It will be noted that the bottom surface of the elevated spike-rib or extension is in a plane above the bottom surface of the base of the support, and the object of this is to prevent any tilting tendency, resulting from the base embedding itself more or less in the tie.

What I claim is,—

1. In an insulated rail joint, a channeled base support having a brace portion, a thrust portion, and an interposed web portion forming a vertical channel, and insulating means.

2. In an insulated rail joint, a channeled base support having an upwardly extending thrust portion, a brace portion, a web portion, and an inclined connecting portion between the web portion and brace portion, forming a vertical channel between them, and insulating means.

3. In an insulated rail joint, a channeled base support having an upwardly extending thrust portion provided with recesses in its edge, an upwardly extending brace portion provided with recesses in its edge, a web portion, and inclined connecting portion, the latter being provided with openings, and insulating means.

4. In an insulated rail joint, a channeled base support comprising a base portion, a neck portion, an upwardly extending brace portion, a thrust portion, and a web portion connecting the brace and thrust portions, and insulating means.

5. In an insulated rail joint, a channeled base support comprising a base portion, a neck portion, an upwardly extending brace portion, a thrust portion, a web portion connecting the brace and thrust portions, and an inclined connecting portion between the web portion and the brace portion, and insulating means.

6. In an insulated rail joint, the combination with a channeled base support having an open vertical channel, of a splice bar mounted in said channel, and oblique bolts securing the splice bar to said base support, and insulating means.

7. In an insulated rail joint, the combination with a channeled base support having an upwardly extending brace portion, thrust portion, and a connecting web forming an open vertical channel, of a splice bar mounted in said channel, and insulating means.

8. In an insulated rail joint, the combination with a channeled base support comprising a brace portion, a thrust portion, a web portion and an inclined connecting portion between the web and brace portions and forming a vertical open channel, of a splice bar mounted in the channel, and oblique bolts mounted in the inclined connecting portion and extending through the splice bar, and insulating means.

9. In an insulated rail joint, the combination with a channeled base support, one of the walls of the channel being inclined, of a splice bar mounted in the channel, and oblique bolts having angular displaced heads fitting said inclined portion and extending through the splice bar, and insulating means.

10. In an insulated rail joint, the combination with a channeled base support, one of the walls of the channel being inclined and provided with openings other than round, of a splice bar mounted in the channel, and oblique bolts provided with necks corresponding to the openings in the inclined portion and inclined heads and extending through the splice bar, and insulating means.

11. In an insulated rail joint, the combination with a channeled base support having a brace portion, a thrust portion provided with an inclined edge, a web portion, and an inclined portion connecting the web and brace portions, of a splice bar mounted in the channel and having cut-away portions, oblique bolts mounted in the inclined portion of the support and extending through the splice bar, and securing devices for said bolts mounted in the cut-away portion of the splice bar and bearing on the inclined edge of the thrust portion, and insulating means.

12. In an insulated rail joint, the combination with the rails, of two complementary channeled base supports having open vertical channels, splice bars mounted in said channels, means for securing the splice bars in the channels, and means for securing the splice bars and base supports to the rails, and insulating means.

13. In an insulated rail joint, the combination with the rails, of two complementary channeled base supports having open vertical channels, splice bars mounted in said channels, oblique bolts for securing the splice bars in their channels, and transverse bolts extending through the splice bars and the webs of the rails for securing the parts together, and insulating means.

14. In an insulated rail joint support, an insulating separator comprising a base portion, a top portion, and an upright portion, the latter being provided with recesses in its upper edge, and a central recess extending through the upright portion.

15. In an insulated rail joint, the combination with the rails, of two insulating separators adapted to embrace opposite portions of the bases of the rails, and two base supports having base portions extending inward below the bottoms of the rails, the base portion of one of the separators being extended across and beyond the space between the base portions of the base supports.

16. In an insulated rail joint, the combination with the rails, of two insulating separators having upright portions adjacent the webs of the rails, and top and bottom portions corresponding to the bases of the rails, and two base supports each having a brace portion bearing against the upright portion of the separator and top and base portions to embrace the bottom of the rails, the uprights of the separators and base supports extending approximately to the vertical center of the webs of the rails.

17. In an insulated rail joint, the combination with the rails, of the insulating separators having upright portions, the base supports also having upright portions, the splice bars mounted on the base supports, and transverse bolts for securing the parts together, the upright portions of the separators and base supports being provided with recesses for the passage of the bolts.

18. In an insulated rail joint, the combination with the rails, of insulating separators, channeled base supports having open vertical channels, insulating splice bars mounted in said channels, means for securing the splice bars to the channeled supports, and means for securing the parts to the rails.

19. In an insulated rail joint, the combination with the rails, of insulating separators having upright portions, channeled base supports having upright portions, said upright portions extending approximately to the vertical center of the webs of the rails, insulating splice bars fitting the channels and bearing against the upper portions of the webs of the rails, means for securing the splice bars to the base supports, and means for securing the parts to the rails.

20. In an insulated rail joint, the combination with the rails, of the insulating separators, the base supports having vertically opened channels and having brace portions and thrust portions, the insulated splice bars mounted in said channels, the splice bars bearing against a portion of the webs of the rails and the under side of the heads of the rails, and means for securing the same to the rails.

21. In an insulated rail joint, the combination with the rails, of the insulating separators, the channeled base supports having thrust portions provided with recesses, insulated splice bars mounted in said channeled supports, transverse bolts for securing the parts to the rails, said bolts being provided with insulated washers fitting the recesses in the thrust-plates and extending beyond the outer surfaces of the thrust-plates, and metallic washers outside of the insulated washers.

22. In an insulated rail joint, the combination with the rails, of insulating splice bars secured to the sides of the rails and having recesses adjacent the ends of the rails, and an insulating end-post interposed between the ends of the rails and extending beyond the webs of the rails into the grooves of the splice bars.

23. In an insulated rail joint, the combination with the rails, of insulating separators having recesses adjacent the ends of the rails, insulating splice bars also having recesses adjacent the ends of the rails, and an insulated end-post interposed between the ends of the rails and extending into the recesses in the separators and splice bars.

24. In an insulated rail joint, the combination with the rails, of insulating separators having upright, top and bottom base portions, the base portion of one being of greater width than the other, channeled base supports having brace, thrust and web portions and an inclined connecting portion between the web and brace portions, insulating splice bars fitting the channeled base supports, and bearing against a portion of the webs of the rails and the under portion of the heads of the rails, oblique bolts for securing the splice bars to the base supports, transverse bolts securing the parts to the rails, insulating washers on said bolts, and metallic washers outside of said insulating washers.

25. In an insulated rail-joint support, an insulating separator comprising a base portion, a top portion and an upright portion, the latter being provided with recesses in its upper edge.

26. In an insulated rail joint, the combination with the rails and splices therefor, of base insulation including a section of insulation arranged below the line of joint bolts and separably interlocked with the latter.

27. In an insulated rail joint, the combination with the rails and splices therefor, of base insulation including a section of insulation arranged below the line of joint bolts, said section of insulation embracing the rail flange and separably interlocked with the bolts.

28. In an insulated rail joint, the combination with the rails and splices therefor, of base insulation including a section of insulation arranged below the line of joint bolts, and having an upright member provided in its upper edge with recesses to receive the bolts.

29. In an insulated rail joint, the combination with the rails and splices therefor, of insulation at the sides of the rails, and an insulating end post interlocked with the said insulation.

30. In an insulated rail joint, the combination with the rails and splices therefor, of an insulating separator arranged below the line of joint bolts, and an insulating end post interlocking with said separator.

In testimony whereof I hereunto affix my signature in the presence of two witnesses.

KOBY KOHN.

Witnesses:
H. N. Mattley,
C. L. Akeson.